United States Patent
Hand et al.

(10) Patent No.: US 8,510,945 B2
(45) Date of Patent: Aug. 20, 2013

(54) METHOD OF MOUNTING A HEAT EXCHANGER IN A GAS TURBINE ENGINE ASSEMBLY

(75) Inventors: John Hand, West Alexandria, OH (US); Bernard A. Luschek, Cincinnati, OH (US); Lonnie R. Stewart, Cincinnati, OH (US); Michael J. Gilloon, Cincinnati, OH (US); Walter A. Hundley, Jr., Cincinnati, OH (US); Jerry W. Myers, Cincinnati, OH (US); Dennis A. McQueen, Cincinnati, OH (US); Michael Peoples, Cincinnati, OH (US)

(73) Assignee: Unison Industries, LLC, Jacksonville, FL (US)

( * ) Notice: Subject to any disclaimer, the term of this patent is extended or adjusted under 35 U.S.C. 154(b) by 386 days.

(21) Appl. No.: 12/827,889

(22) Filed: Jun. 30, 2010

(65) Prior Publication Data

US 2011/0146051 A1   Jun. 23, 2011

Related U.S. Application Data

(60) Provisional application No. 61/289,337, filed on Dec. 22, 2009.

(51) Int. Cl.
*F16L 39/04* (2006.01)
(52) U.S. Cl.
USPC ...... 29/889.2; 29/890.03; 29/458; 29/525.01; 29/525.02; 248/638; 60/266; 60/267; 60/730; 60/39.83; 415/134; 415/135; 415/136; 415/138; 415/119; 285/187

(58) Field of Classification Search
USPC ......... 29/889.2, 890.03, 458, 525.01, 525.02; 415/134, 135, 136, 138, 119, 175, 176, 177, 415/178; 60/39.08, 39.32, 39.51, 39.83, 60/266, 267, 730; 248/560, 614, 620, 638; 285/137, 364, 406, 224, 187
See application file for complete search history.

(56) References Cited

U.S. PATENT DOCUMENTS

| | | | |
|---|---|---|---|
| 4,063,847 A | | 12/1977 | Simmons |
| 4,072,327 A | * | 2/1978 | Young ...................... 285/124.4 |
| 5,273,249 A | * | 12/1993 | Peterson et al. ............. 248/550 |
| 5,743,509 A | * | 4/1998 | Kanda et al. .................. 248/635 |
| 5,899,660 A | | 5/1999 | Dodd |
| 6,305,899 B1 | | 10/2001 | Saunders |
| 6,371,721 B1 | | 4/2002 | Sathianathan et al. |
| 6,557,816 B2 | * | 5/2003 | Yoshida ...................... 248/674 |
| 7,370,467 B2 | | 5/2008 | Eleftheriou et al. |
| 2007/0280819 A1 | | 12/2007 | Eleftheriou et al. |
| 2008/0095611 A1 | | 4/2008 | Storage et al. |

* cited by examiner

*Primary Examiner* — David Bryant
*Assistant Examiner* — Steven A Maynard
(74) *Attorney, Agent, or Firm* — Armstrong Teasdale LLP

(57) ABSTRACT

A method of assembling a heat exchanger in a gas turbine engine assembly is provided. The method includes providing a structural body including a wall having an elongated slot, providing a heat exchanger operably associated with a bracket, and providing a slip joint for coupling the bracket to the structural body. The slip joint includes a standoff, an elongated member, and a biasing member disposed about the elongated member. The standoff is inserted through the wall so that the biasing member imparts a predetermined biasing force between the bracket and the structural body. The slip joint allows relative sliding movement between the bracket and the structural body when a sliding force due to thermal expansion or contraction is greater than the biasing force.

10 Claims, 7 Drawing Sheets

METHOD OF MOUNTING A HEAT EXCHANGER IN A GAS TURBINE ENGINE ASSEMBLY

CROSS REFERENCE TO RELATED APPLICATIONS

This application claims priority and benefit of U.S. Provisional Patent Application Ser. No. 61/289,337 filed Dec. 22, 2009, the disclosure of which is incorporated herein by reference in its entirety.

BACKGROUND OF THE INVENTION

The field of this disclosure relates generally to methods for mounting a heat exchanger in a gas turbine engine assembly, and more particularly to mounting the heat exchanger using a slip joint assembly.

Many known gas turbine engines have engine subsystems that should be cooled to facilitate improving the life span and/or reliability of the engine. To facilitate cooling the engine subsystems, at least some known gas turbine engine assemblies include radiators that are exposed to air flowing through the engine assembly to facilitate cooling a working fluid (e.g., an oil and/or a fuel) flowing through the radiator. However, many gas turbine engine radiators have been known to obstruct airflow through the engine assembly, causing turbulence and/or pressure drops within the engine assembly, which could adversely affect engine performance. Additionally, interruption of the radiator with joint assemblies reduces the area available for cooling. Moreover, at least some known gas turbine engine radiators are susceptible to high cycle fatigue (e.g., fatigue resulting from vibrations caused by rotor imbalance) and/or low cycle fatigue (e.g., fatigue resulting from thermal growth of the radiator caused by a temperature differential between the radiator and the supporting structure).

As such, it would be beneficial to provide a heat exchanger mounting system that facilitates increasing an efficiency of a gas turbine engine, while simultaneously addressing high cycle fatigue and low cycle fatigue concerns.

BRIEF DESCRIPTION OF THE INVENTION

Exemplary embodiments disclosed herein provide a mounting system for a heat exchanger that provides sufficient stiffness for vibrational high cycle fatigue mediation while relieving low cycle fatigue stress caused by thermal expansion.

In an exemplary embodiment, a heat exchanger assembly includes a first member comprising an arcuate body having a plurality of fins extending from a radial inner surface and a plurality of circumferentially extending spaced attachment sites defined on a radial outer surface. A bracket assembly is attached in supported connection with the first member by at least one of the attachment sites, wherein the bracket assembly is sized and configured for operable association with a slip joint assembly for supported attachment of the heat exchanger assembly to a structural body of a gas turbine assembly.

In an exemplary embodiment, a heat exchanger assembly includes a first member comprising an arcuate body having a plurality of fins extending from a radial inner surface and a plurality of circumferentially extending weld tabs defined on a radial outer surface. A bracket assembly includes a bracket having a base portion and first and second arm portions extending from the base portion to provide the bracket with a c-shaped cross section. Each of the first and second arm portions are fixedly secured to an associated weld tab such that the base portion is arranged in spaced relationship to the radial outer surface. The bracket includes an opening defined in the base portion being sized and configured for reception of an attachment member. The bracket assembly includes a fastener member extending in the space between the base portion and the radial outer surface proximate the opening.

In an exemplary embodiment, a heat exchanger support includes a bracket assembly including a bracket having a base portion and first and second arm portions extending from the base portion to provide the bracket with a c-shaped cross section and defining an interior region. The bracket includes an opening defined in the base portion and being sized and configured for reception of an attachment member. The bracket assembly includes a fastener member selectively secured to the bracket proximate the opening within the interior region.

In an exemplary embodiment, a method of assembling a through-wall mounting system for a wall including a slot having an elongated cross-section is provided, the slot extending through the wall from a first surface of the wall to a second surface of the wall. The method includes providing a bracket and a slip mount, the slip mount including a standoff and a biasing element, wherein the standoff includes a elongated member and a flange extending outwardly from the elongated member, the biasing element positioned about the elongated member. The method also includes coupling the bracket to a device to be mounted on the wall, and positioning the bracket and the device adjacent the first surface of the wall. The method further includes inserting the standoff through the slot from the second surface of the wall to the first surface of the wall such that the elongated member is adjacent the bracket and such that the biasing element is positioned about the elongated member between the second surface of the wall and the flange, and coupling the standoff to the bracket such that the standoff transfers a first predetermined load to the second surface of the wall via the flange and the biasing element and transfers a second predetermined load to the bracket via the elongated member to facilitate enabling the standoff to slide along the elongated cross-section of the slot.

In an exemplary embodiment, a through-wall mounting system for a wall including a slot having an elongated cross-section is provided, the slot extending through the wall from a first surface of the wall to a second surface of the wall. The system includes a bracket configured to be coupled to a device to be mounted on the wall, the bracket positionable adjacent the first surface of the wall. The system also includes a standoff comprising a elongated member and a flange extending outwardly from the elongated member, the standoff sized to extend through the slot from the second surface of the wall to the first surface of the wall such that the elongated member is adjacent the bracket, and a biasing element sized to be positioned about the elongated member between the second surface of the wall and the flange when the standoff is fastened to the bracket such that the standoff transfers a first predetermined load to the second surface of the wall via the flange and the biasing element and transfers a second predetermined load to the bracket via the elongated member to facilitate enabling the standoff to slide along the elongated cross-section of the slot.

DETAILED DESCRIPTION OF THE INVENTION

The following detailed description illustrates exemplary mounting systems and methods of assembling the same by way of example and not by way of limitation. The description should clearly enable one of ordinary skill in the art to make and use the disclosure, and the description describes several embodiments, adaptations, variations, alternatives, and uses of the disclosure, including what is presently believed to be the best mode of carrying out the disclosure. The disclosure is described herein as being applied to a preferred embodiment as applied to a gas turbine engine assembly. However, it is contemplated that this disclosure has general application in a broad range of systems and/or a variety of other commercial, industrial, and/or consumer applications.

In general terms, a heat exchanger assembly for a gas turbine engine and a mounting system is disclosed herein. The heat exchanger assembly includes a plurality of arcuate manifolds each supporting an array of fins extending from a radial inner surface. A plurality of circumferentially extending spaced weld tabs is integrally formed on the radial outer surface. A bracket assembly is utilized to attach the heat exchanger to a structural member of a gas turbine engine assembly, e.g., a fan case in such a manner as to maximize the surface area available for fin placement, and to not interfere with the cooling circuits within the manifold.

Figure 1:
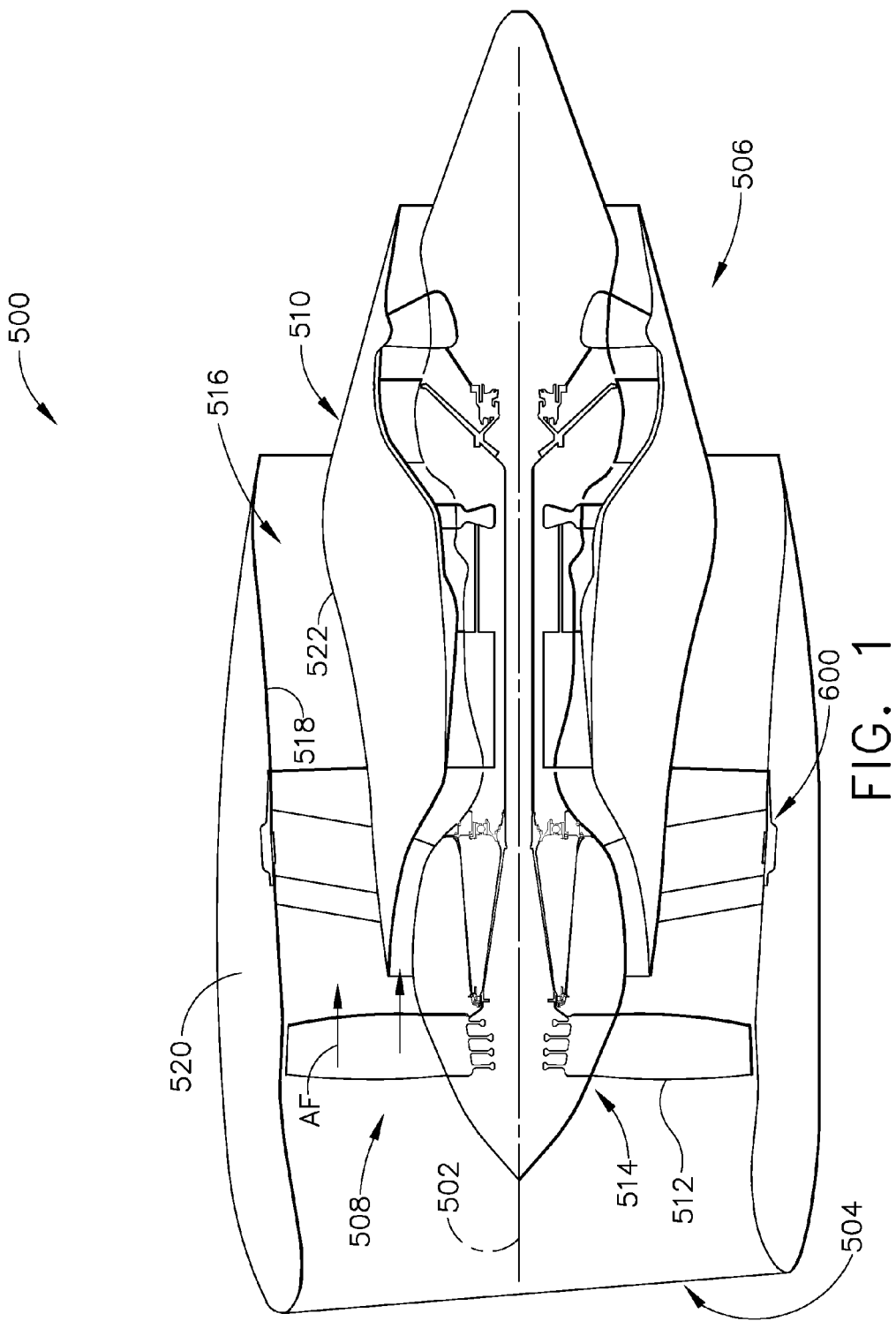
FIG. 1 is a schematic view of a gas turbine engine assembly.

An exemplary bracket assembly includes a bracket that supports a fastener between the bracket base and the heat exchanger FIG. 1 is a schematic illustration of an exemplary gas turbine engine assembly 500. Gas turbine engine assembly 500 has a centerline axis 502 and a radius R (shown in FIG. 2) and includes an intake side 504, an exhaust side 506, a fan assembly 508, and a core gas turbine engine 510. Fan assembly 508 includes an array of fan blades 512 extending radially outward from a rotor disk 514 and positioned axially forward of a bypass duct 516 defined between a first duct surface 518 and a second duct surface 522. In an exemplary embodiment, a heat exchanger assembly 600 is coupled to a fan case 520 axially afterward of fan assembly 508 such that heat exchanger assembly 600 is exposed to an airflow AF through bypass duct 516. In other embodiments, a heat exchanger assembly 600 may be mounted at any suitable location on gas turbine engine assembly 500.

Figure 2:
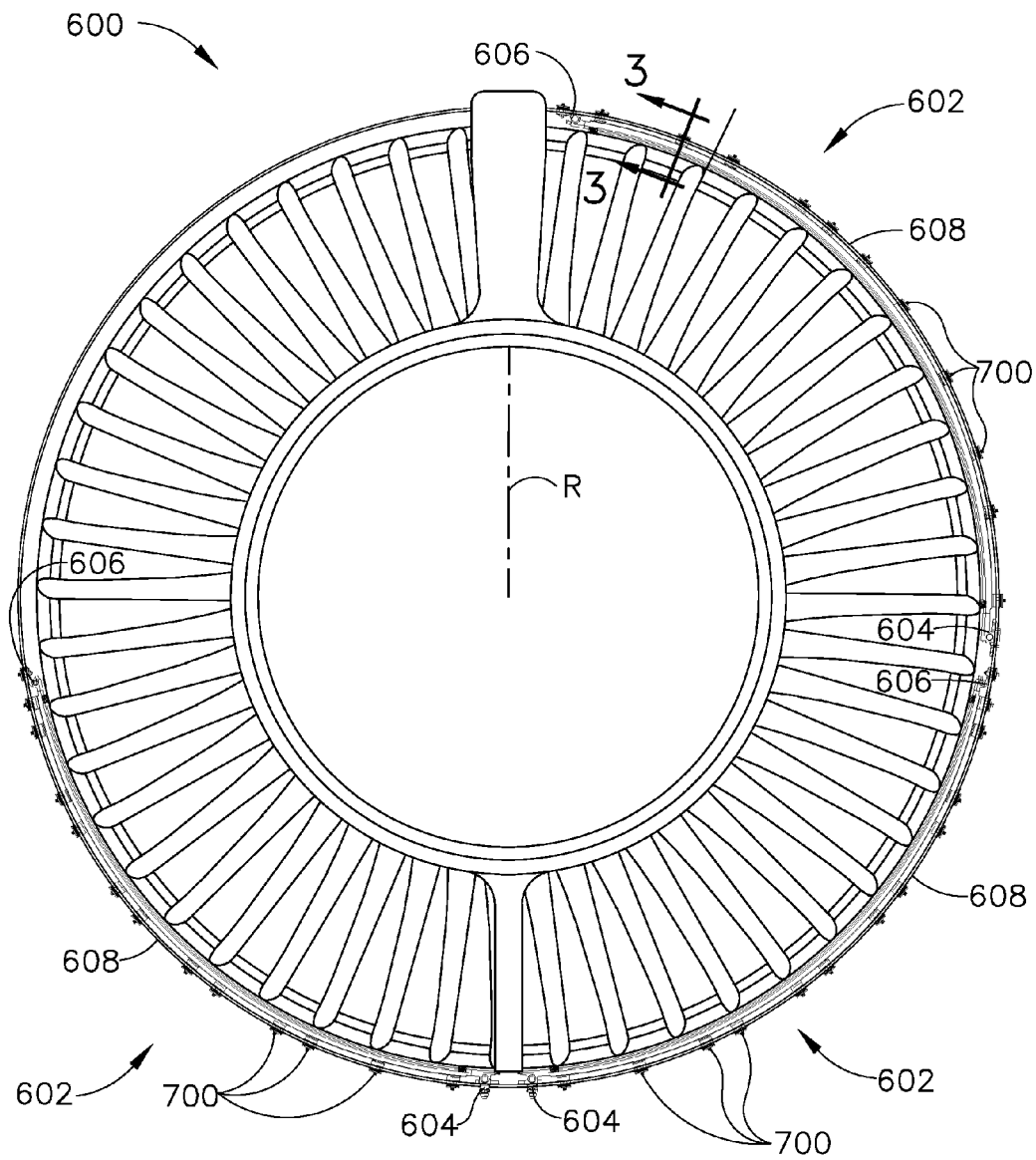
FIG. 2 is a side elevation view of an engine assembly having a heat exchanger assembly mounted thereto.

FIG. 2 is a side elevation view of an exemplary heat exchanger assembly 600 shown mounted in operational engagement with fan case 520. In an exemplary embodiment, heat exchanger assembly 600 includes a plurality of substantially similar circumferentially extending heat exchangers 602. Each heat exchanger 602 has a first end 604, a second end 606, and a substantially arcuate body 608 extending between first end 604 and second end 606, such that heat exchanger 602 substantially conforms to a profile of bypass duct 516 (shown in FIG. 1). Heat exchanger assembly 600 may have any suitable number of heat exchangers 602 having any suitable profile that enables heat exchanger assembly 600 to function as described herein.

In an exemplary embodiment, first end 604 may be fixedly coupled (e.g., bolted) to a fan case 520 and body 608 and second end 606 are slideably coupled to fan case 520 via a plurality of mounting systems 700, as described below. Each heat exchanger 602 may be coupled to fan case 520 via any suitable number of mounting systems 700. In an exemplary embodiment about 20 mounting systems 700 may be utilized for each heat exchanger 602. In an exemplary embodiment, first end 604 includes an inlet port (not shown) and an outlet port (not shown) to facilitate coupling heat exchanger 602 to at least one fluid transfer line (not shown) and directing a flow of heated fluid through heat exchanger 602 to be cooled.

In an exemplary embodiment, heat exchanger assembly 600 is coupled to fan case 520 such that heat exchangers 602 are circumferentially spaced apart from one another (e.g., by at least 0.25 inches, for example). In one embodiment, a faring (not shown) substantially spans the space between adjacent heat exchangers 602 to facilitate a smoother flow of air over heat exchanger assembly 600. Alternatively, heat exchanger assembly 600 may be mounted at any suitable location on gas turbine engine assembly 500 using any suitable fasteners, such that heat exchangers 602 have any suitable orientation relative to one another.

With particular reference to FIGS. 3-8, in an exemplary embodiment, heat exchanger 602 includes a manifold 610 and a plurality of cooling fins 612 radially extending from manifold 610. Manifold 610 includes a radially inner surface 614, a radially outer surface 616, an upstream wall 618, and an opposite downstream wall 620, such that manifold 610 has a substantially rectangular cross-sectional profile. Manifold 610 defines at least one channel 622 that extends lengthwise therethrough and is selectively sized to facilitate channeling a flow of heated fluid (e.g., oil) to be cooled. In an exemplary embodiment, each channel 622 has a substantially rectangular cross-sectional profile. In other embodiments, manifold 610 and/or each channel 622 may have any suitable cross-sectional profile (e.g., circular).

Heat exchanger 602 may include an integral manifold 610 and cooling fins 612 formed together via an aluminum extrusion process. In other embodiments, each cooling fin 612 may be coupled to manifold 610 via a bonding process (e.g., a welding process or a brazing process) and/or formed as a non-segmented, unitary body. Alternatively, heat exchanger 602 may be fabricated via any suitable manufacturing process and/or from any suitable material. As discussed in greater detail below, manifold 610 may have a plurality of circumferential integrally formed weld tabs 615 to facilitate mounting the heat exchangers onto the fan case.

Figure 5:
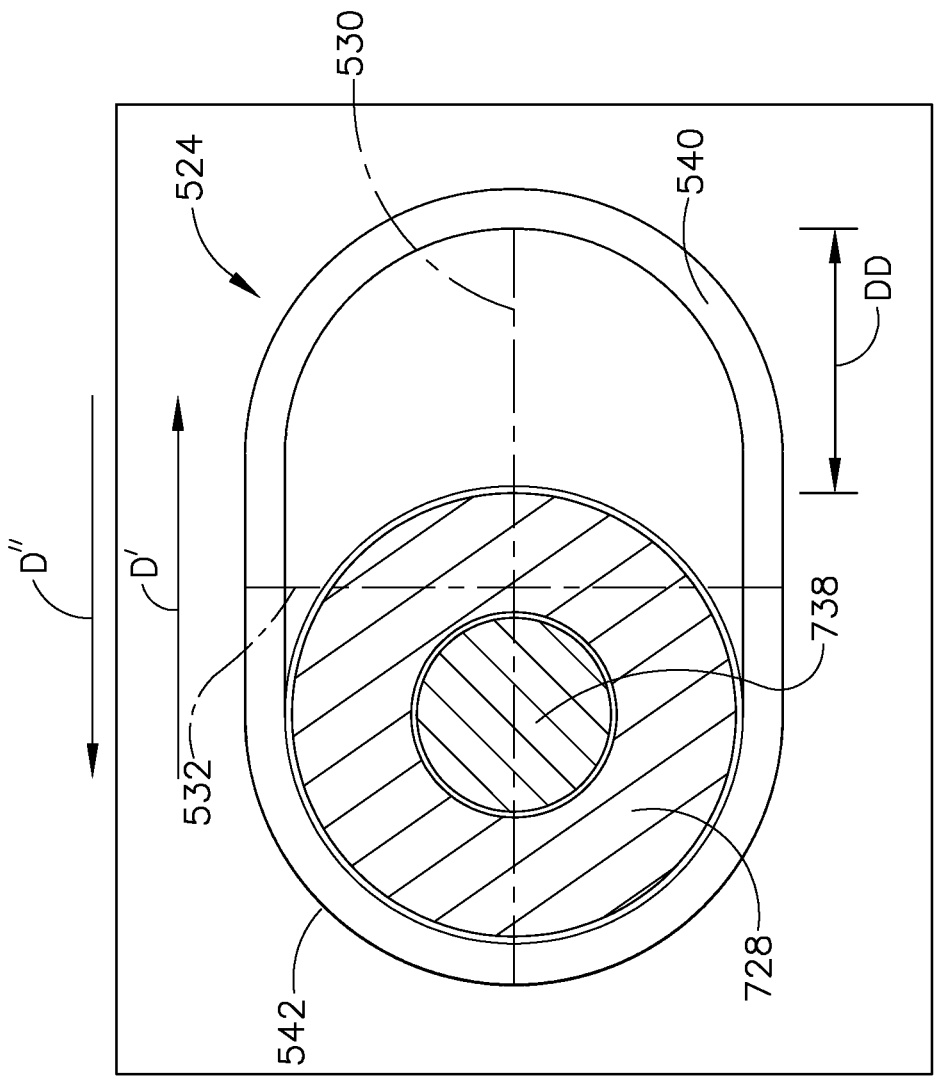
FIG. 5 is a cross-sectional view taken along 5-5 of FIG. 4.
Figure 6:
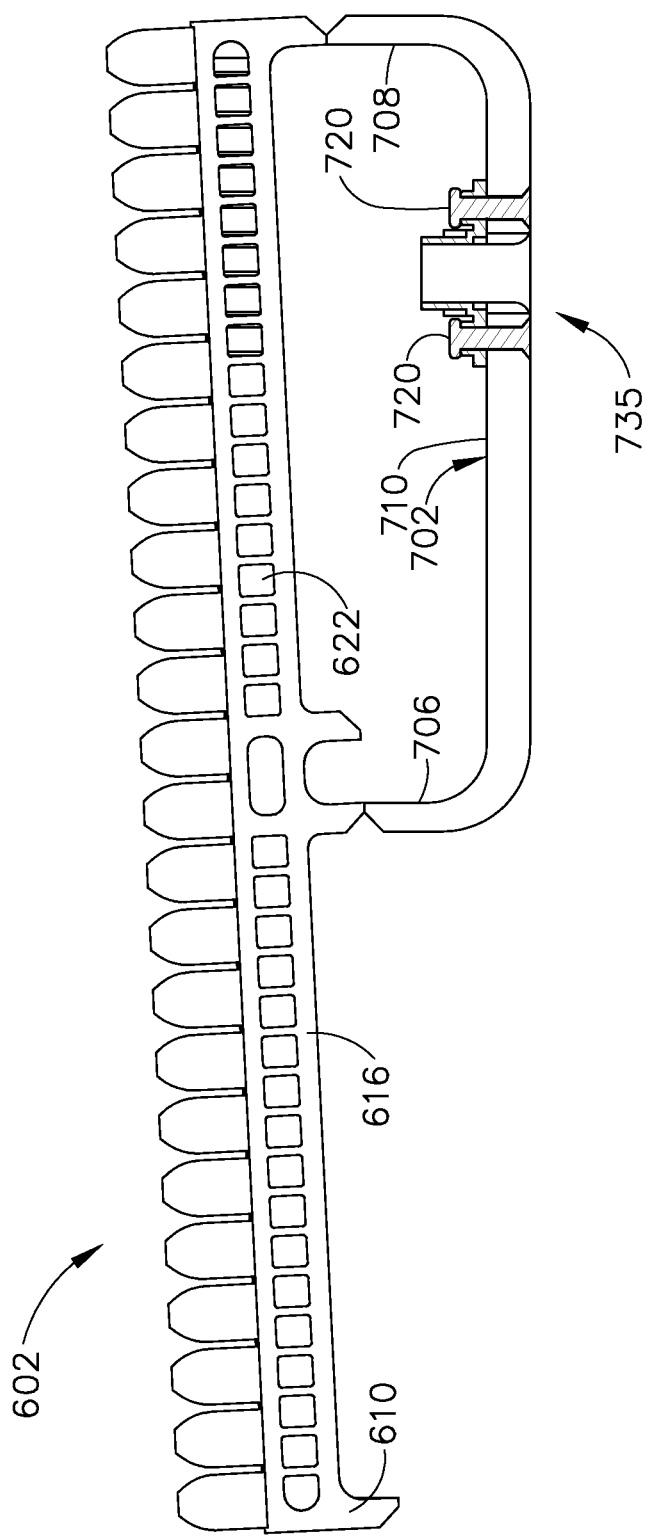
FIG. 6 is a schematic side view of a heat exchanger assembly.
Figures 7, 8:
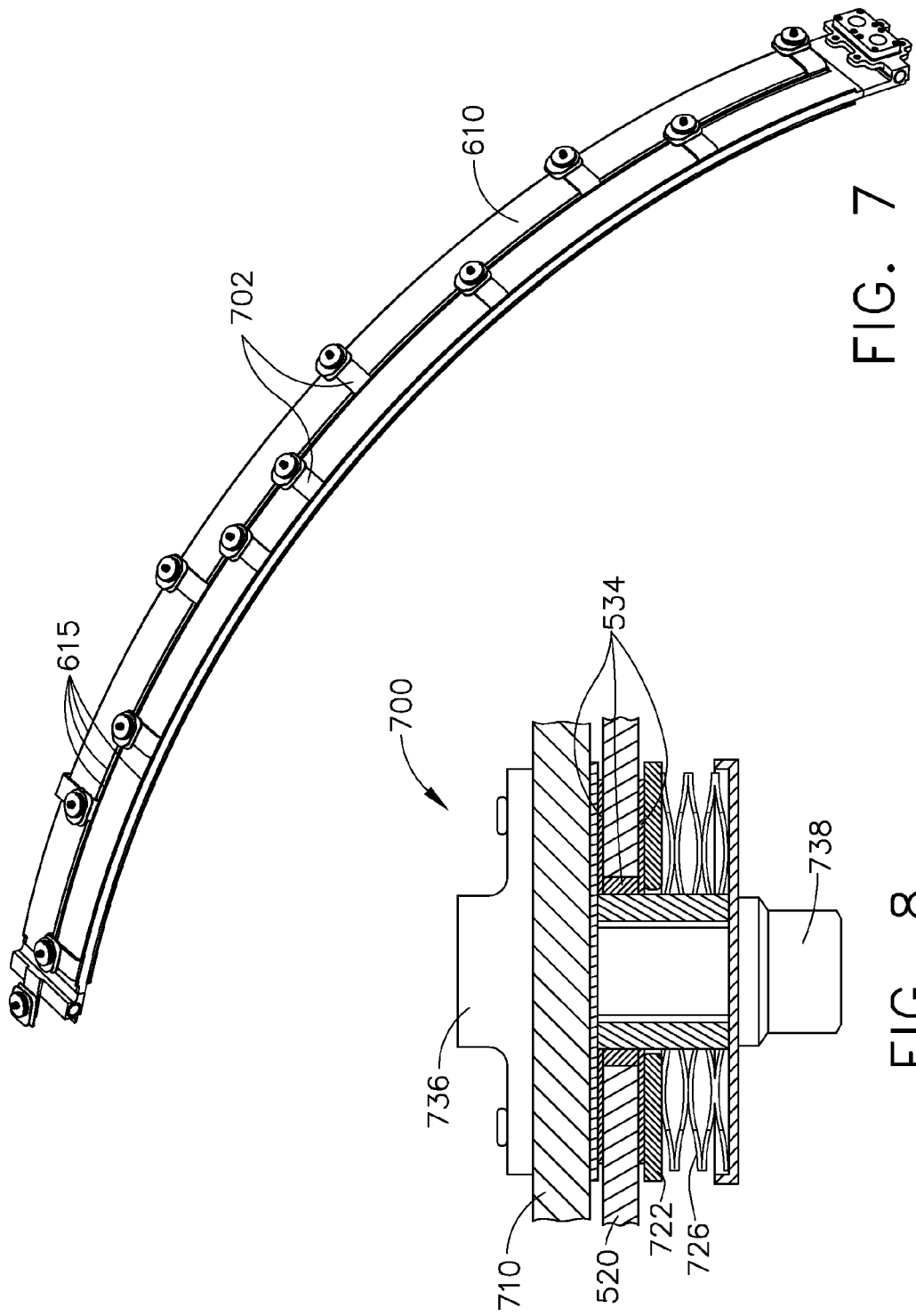
FIG. 7 is a schematic view of a heat exchanger assembly.
FIG. 8 is a schematic view of a mounting system for a heat exchanger assembly.

In an exemplary embodiment, each mounting system 700 facilitates coupling heat exchanger 602 to fan case 520 at a slot 524 that extends substantially radially through a wall 560 of fan case 520. Specifically, slot 524 has a first end 526 defined on a radially inner first surface 544 of wall 560, a second end 528 defined on a radially outer second surface 546 of wall 560, and a length SL (see FIG. 4) extending from first end 526 to second end 528, such that slot 524 has an elongated cross-sectional profile (i.e., a major axis 530 and a minor axis 532; FIG. 5). In other embodiments, slot 524 may have any suitable shape and/or cross-sectional profile that enables mounting system 700 to function as described herein.

Exemplary embodiments enable surfaces to be protected from wear during sliding operation of the slip joint. For example anti-wear members or coatings may be utilized. For ease of illustration the anti-wear members or coatings are referenced as anti-wear elements 534. In an exemplary embodiment, anti-wear elements 534 are suitably coupled to wall 560 proximate to slot 524. Specifically, an anti-wear element 534 includes a first portion 536 coupled to first surface 544 of wall 560 circumferentially about slot 524, a second portion 538 coupled to second surface 546 of wall 560 circumferentially about slot 524, and a third portion 540 coupled to an interior surface 542 of slot 524. In one embodiment, second portion 538 and third portion 540 may be integrally formed together and separately from first portion 536. In other embodiments, anti-wear element 534 may have any suitable number of portions that are either formed integrally together or formed separately from one another.

In an exemplary embodiment, a plurality of mounting systems 700 are utilized to mount the heat exchanger assemblies 600 to a structure in the gas turbine engine, for example, a fan case. The mounting systems 700 provide adequate stiffness to address vibrational concerns, while allowing for thermal expansion of the heat exchangers both axially and circumferentially.

In an exemplary embodiment, each mounting system 700 may include a bracket 702 and a sliding joint 704 to facilitate coupling the heat exchanger 602 to the fan case 520 or other engine structure. Bracket 702 includes a fastener assembly 735 for receiving a bolt 738 of the sliding joint 704. In an exemplary embodiment, fastener assembly 735 includes a fixed nut plate 736 whereby attachment of the sliding joint 704 to bracket 702 is accomplished by turning the bolt 738 rather than by tightening a nut, which may be accomplished from the outer diameter of fan case 520, as set forth in greater detail below.

Figure 3:
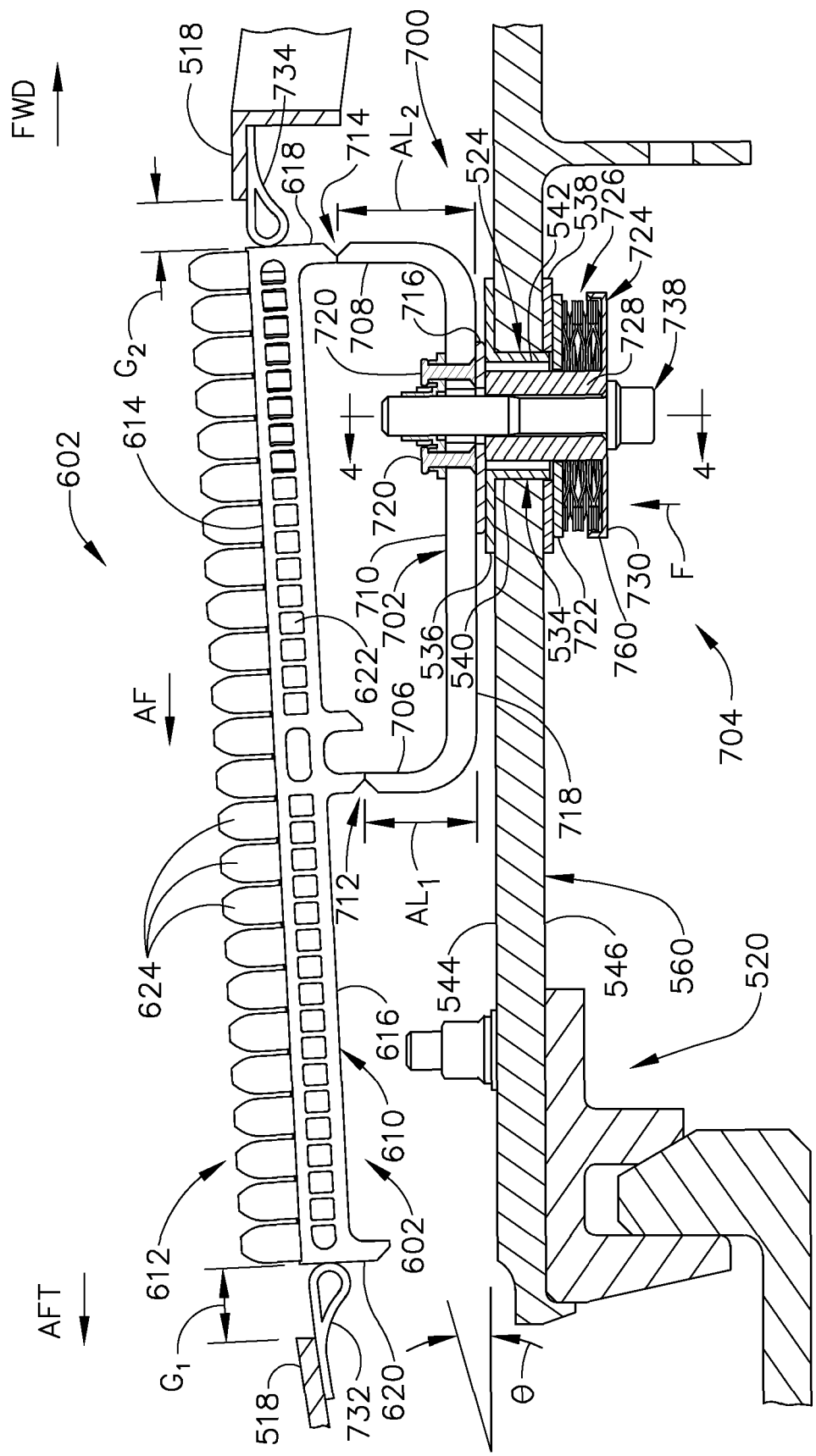
FIG. 3 is a cross-sectional view taken along 3-3 of FIG. 2 showing a mounting system for a heat exchanger assembly.
Figure 4:
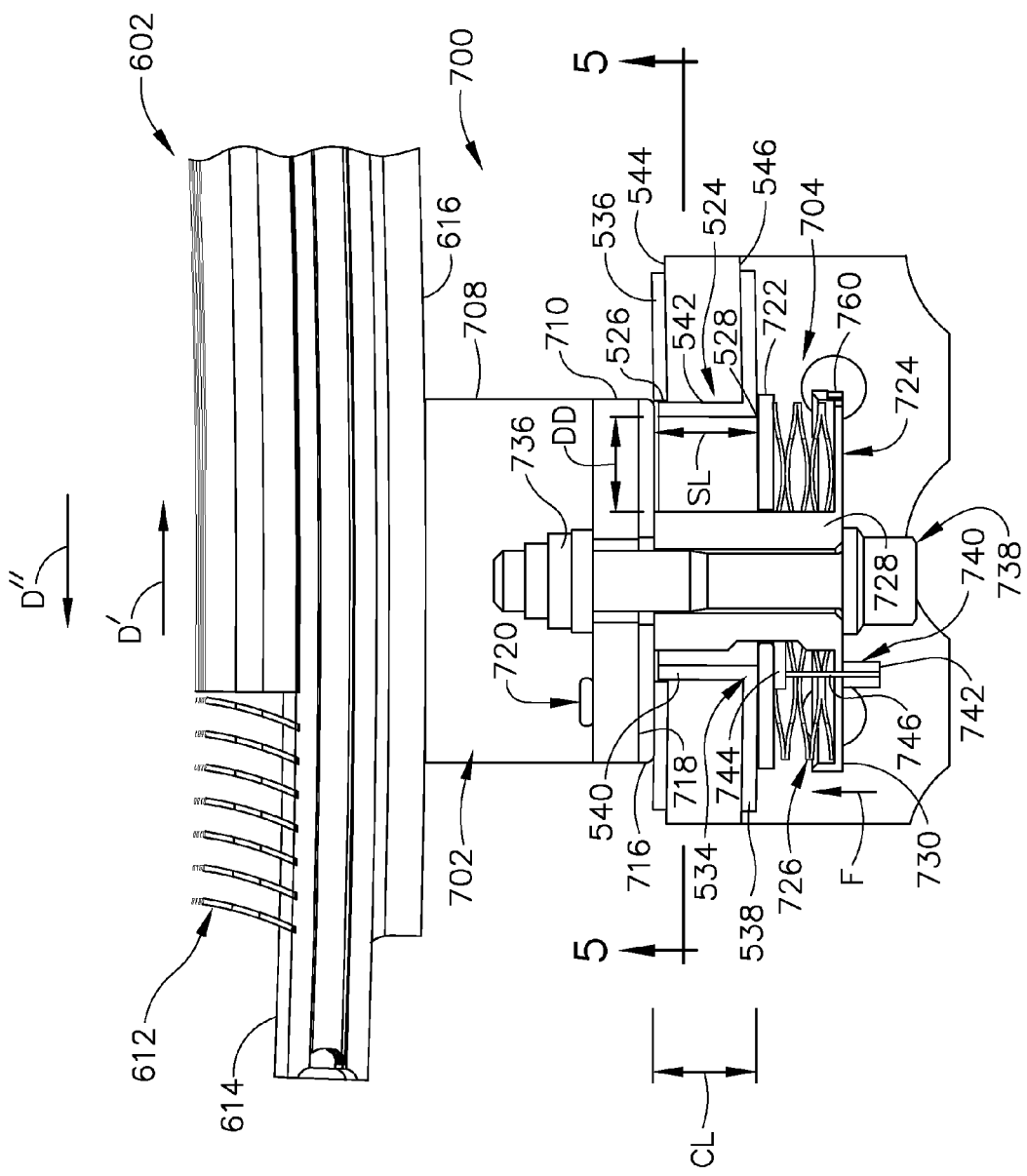
FIG. 4 is a cross-sectional view taken along 4-4 of FIG. 3.

In an exemplary embodiment, bracket 702 includes a first arm 706, a second arm 708, and a base 710 that extends between first arm 706 and second arm 708. In an exemplary embodiment, the length of bracket 702 is less than a width of manifold 610, as illustrated in FIG. 3. First arm 706 has a first length $AL_1$, and second arm 708 has a second length $AL_2$. In an exemplary embodiment, second length $AL_2$ may be greater than first length $AL_1$ if warranted by the particular application. In an exemplary embodiment, bracket 702 is fixedly secured at the first arm 706 and the second arm 708 to spaced weld tabs 615. In an exemplary embodiment manifold 706 includes at least three continuous weld tabs 615 to accommodate the length of brackets 702. The continuous weld tabs allow for placement of brackets 702 at various positions along the manifold 706. In an exemplary embodiment, brackets 702 are spaced unevenly along the length of the manifold 706 to minimize or prevent sinusoidal modes in the heat exchanger. In an exemplary embodiment, the brackets allow for varied positions of the fastener assemblies 735 along the axial length of the brackets 702. In an exemplary embodiment, manifold 706 may accommodate two circumferential rows of brackets 702 which may be offset relative each other. In other exemplary embodiments, manifold 706 includes four continuous weld tabs 615. Other arrangements of brackets and weld tabs are contemplated within the scope of this disclosure and the foregoing description is given by way of example only. In an exemplary embodiment, a spacer 716 (e.g., a steel spacer) may be coupled to a bottom face 718 of base 710 via at least one fastener (e.g., a rivet 720).

In an exemplary embodiment, slip mount 704 includes a retainer plate or washer 722, a standoff 724, and a biasing element 726 (e.g., wave spring). Standoff 724 includes a hollow elongated member or bushing 728, which has a length CL, and a flange 730 extending outwardly from elongated member 728. In an exemplary embodiment, elongated member 728 functions to limit the movement of bolt 738 relative the bracket 702, and thus limits or preloads the compression of biasing element (wave spring) 726. The amount of compression of biasing element (wave spring) 726 influences the biasing force exerted by the slip joint onto fan case 520. The biasing force is sufficient to withstand vibrational forces, but less than thermal forces, herein referred to as "sliding forces." Thus, the joint will not move due to smaller vibration forces, but it will slide when the sliding force from thermal growth tendencies exceeds the preloaded biasing force.

In one embodiment, flange 730 includes a lip 760 to facilitate supporting biasing element 726 about elongated member 728. In another embodiment, flange 730 is formed integrally with elongated member 728 and extends circumferentially outward from elongated member 728. Washer 722 and biasing element 726 are substantially annular such that elongated member 728 is insertable through biasing element 726 and/or washer 722, as described below. In other embodiments, standoff 724, washer 722, and/or biasing element 726 may include any suitable structure and may be formed integrally together or separately from one another to enable mounting system 700 to function as described herein.

In an exemplary embodiment, mounting system 700 also includes a locking device 740 including a cap 742 seated against flange 730, a foot 744 either formed with or coupled to washer 722, and a link 746 (e.g., a cable) extending between foot 744 and cap 742 to facilitate holding biasing element 726 between washer 722 and flange 730. In other embodiments, locking device 740 may include any suitable structure that enables locking device 740 to function as described herein.

To assemble mounting system 700, bracket 702 is positioned adjacent fan case 520 such that spacer 716 is seated against first portion 536 of anti-wear element 534 and such that manifold 610 is oriented at an angle θ relative to base 710. In this way, radially inner surface 614 of manifold 610 is substantially aligned with a contour of first duct surface 518 such that only cooling fins 612 extend into bypass duct 516.

In an exemplary embodiment, upstream wall 618 and downstream wall 620 of manifold 610 are spaced from first duct surface 518 by a first gap $G_1$ and a second gap $G_2$, respectively, to facilitate permitting manifold 610 to expand along centerline axis 502 when heated, as described below. In one embodiment, a first seal 732 substantially covers first gap $G_1$, and a second seal 734 substantially covers second gap $G_2$ to facilitate blocking airflow through first gap $G_1$ and/or second gap $G_2$ during operation of gas turbine engine assembly 500.

With bracket 702 positioned adjacent fan case 520, standoff 724 is inserted through slot 524 with biasing element 726 and washer 722 circumscribing elongated member 728 such that biasing element 726 is held between flange 730 and washer 722 via locking device 740. Locking device 740 is useful to facilitate easier handling of slip mount 704 with biasing element 726 and washer 722 positioned about elongated member 728.

When elongated member 728 contacts spacer 716, a bolt 738 is inserted through elongated member 728 such that bolt 738 engages a nut 736 and/or bracket 702 to facilitate fastening bracket 702 to fan case 520. A frictional engagement is thus established between spacer 716 and first portion 536 of anti-wear element 534 and between washer 722 and second portion 538 of anti-wear element 534.

In an exemplary embodiment, length CL of elongated member 728 is greater than length SL of slot 524 such that, when a user applies torque to bolt 738, a limited load is transferred to fan case 520 (i.e., a first predetermined load is transferred to fan case 520 via flange 730, biasing element 726, and/or washer 722, and a second predetermined load is transferred to bracket 702 via elongated member 728). The frictional engagement between mounting system 700 and fan case 520 is thus limited to a predetermined amount that is sufficient to stabilize mounting system 700 against high cycle fatigue, such as vibration. However, when a sliding force overcomes the frictional engagement, standoff 724 and bolt 738 are able to slide along major axis 530 of slot 524 to mitigate the effects of low cycle fatigue, such as a thermal growth and contraction of heat exchanger 602.

In operation, a heated fluid (e.g., oil) is directed through channels 622 of heat exchanger 602 via the inlet and outlet ports at first end 604. When the heated fluid flows through manifold 610, heat is transferred from the heated fluid to cooling fins 612 via manifold 610 and is dissipated from cooling fins 612 into air flowing through cooling fins 612 (i.e., air flowing through bypass duct 516) to facilitate reducing a temperature of the heated fluid flowing through manifold 610.

When the heated fluid flows through manifold 610, a temperature of manifold 610 increases such that a material from which manifold 610 is fabricated (e.g., aluminum) expands. Because heat exchanger 602 is fixed to fan case 520 at first end 604, the expansion of manifold 610 facilitates a lengthwise extension of manifold 610 (i.e., a first circumferential displacement of second end 606). The lengthwise extension of manifold 610 facilitates causing bracket 702 to slide circumferentially in a first direction D' along first surface 544 of fan case 520 such that standoff 724 and bolt 738 slide a distance DD along major axis 530 of slot 524.

When the temperature of manifold 610 is subsequently reduced, the material (e.g., aluminum) of manifold 610 contracts, which facilitates a lengthwise contraction of manifold 610 (i.e., a second circumferential displacement of second end 606). Specifically, the lengthwise contraction of manifold 610 facilitates causing bracket 702 to slide circumferentially along first surface 544 of fan case 520 in a second direction D" that is substantially opposite first direction D' such that standoff 724 and bolt 738 slide back first distance DD along major axis 530. In one embodiment, slot 524, elongated member 728, and/or bolt 738 are sized to facilitate a lengthwise extension of manifold by about 0.3 inches (i.e., sized such that distance DD can be up to 0.3 inches). In other embodiments, slot 524, elongated member 728, and/or bolt 738 are sized to facilitate any suitable lengthwise extension of manifold 610.

The methods and systems described herein facilitate mounting a device to a structural member such as the wall of a fan case and permitting relative sliding movement therebetween. In an exemplary embodiment, the methods and systems described herein facilitate supporting a heat exchanger in high cycle fatigue (HCF) and low cycle fatigue (LCF) load conditions (i.e., providing sufficiently stable support to the heat exchanger under HCF loads, while permitting sufficient circumferential slippage of the heat exchanger under thermally induced LCF loads).

Specifically, the methods and systems described herein facilitate limiting a user applied torque load transferred to the fan case, while facilitating ensuring that a sufficient load is transferred to the fan case to facilitate generating a frictional engagement between the slip mount and the fan case to stabilize the heat exchanger under HCF loads. The methods and systems described herein further facilitate enabling the heat exchanger to expand lengthwise such that thermally induced deflection and/or LCF stress applications to either the heat exchanger and/or the fan case are facilitated being minimized, while wear damage to the fan case during thermally induced slippage is facilitated being reduced.

Additionally, the methods and systems described herein facilitate providing a mounting system that is sized to facilitate reliably supporting a heat exchanger in a relatively limited space, while orienting the mounting system to facilitate enabling sufficient access to the mounting system by maintenance personnel. Moreover, the methods and systems described herein facilitate increasing an efficiency of a gas turbine engine and reducing a manufacturing cost associated with fabricating a heat exchanger for a gas turbine engine, while increasing a reliability of the heat exchanger and extending a useful life of the heat exchanger.

Exemplary embodiments of mounting systems and methods of assembling the same are described above in detail. The methods and systems are not limited to the specific embodiments described herein, but rather, components of the methods and systems may be utilized independently and separately from other components described herein. For example, the methods and systems described herein may have other industrial and/or consumer applications and are not limited to practice with only gas turbine engines. Rather, the present invention can be implemented and utilized in connection with many other industries.

While the invention has been described in terms of various specific embodiments, those skilled in the art will recognize that the invention can be practiced with modification within the spirit and scope of the claims.

What is claimed is:

1. A method comprising:
   providing a structural body for use in a gas turbine engine, wherein the structural body includes a wall having a slot therein with an elongated cross-section, the slot extending through the wall from a first inner surface of the wall to a second outer surface of the wall;
   providing a heat exchanger being operably associated with a bracket;
   providing a slip joint including a standoff and a biasing element, wherein the standoff includes a hollow cylindrical elongated member and a flange extending orthogonally outwardly from an end of the elongated member, the biasing element positioned about the elongated member;
   positioning the heat exchanger proximate the first surface such that the bracket is positioned adjacent the first surface of the wall;
   inserting the standoff through the slot from the second surface of the wall to the first surface of the wall such that the flange remains outside the wall and such that a distal end of the elongated member is adjacent the bracket and such that the biasing element is positioned about the elongated member between the second surface of the wall and the flange; and
   coupling the standoff to the bracket using a fastener extending through the elongated member such that the standoff transfers a first predetermined load to the second surface of the wall via the flange and the biasing element and transfers a second predetermined load to the bracket via the elongated member to facilitate enabling the standoff to slide along the elongated cross-section of the slot, a first end of the fastener bearing on the flange, a second opposite end of the fastener captured using the bracket.

2. A method in accordance with claim 1, wherein providing a bracket comprises providing a bracket including a base, a first arm extending from the base, and a second arm extending from the base, the first arm having a first length and the second arm having a second length that is greater than the first length, and wherein coupling the bracket to a device comprises coupling the first arm and the second arm of the bracket to the device such that the device is oriented at an angle relative to the base.

3. A method in accordance with claim 1, wherein providing a bracket and a slip mount comprises providing the flange of the standoff with a lip to facilitate supporting the biasing element about the elongated member.

4. A method in accordance with claim 1, wherein coupling the standoff to the bracket comprises inserting a bolt through the elongated member and the bracket.

5. A method in accordance with claim 1, further comprising coupling a protective coating to the wall such that a first portion of the protective coating is coupled to the first surface of the wall about the slot, a second portion of the protective coating is coupled to the second surface of the wall about the slot, and a third portion of the protective coating is coupled to an interior surface of the slot, the first portion positioned between the bracket and the first surface of the wall and the second portion positioned between the biasing element and the second surface of the wall via the bracket.

6. A method in accordance with claim 5, further comprising positioning a washer about the elongated member of the standoff between the biasing element and the second portion of the protective coating.

7. A method in accordance with claim 5, further comprising coupling a spacer to the base of the bracket such that the spacer is positioned between the base and the first portion of the protective coating.

8. A method in accordance with claim 5, wherein coupling a protective coating to the wall comprises providing the protective coating with the second portion and the third portion integrally formed together.

9. A method in accordance with claim 6, further comprising coupling together the washer and the flange of the standoff via a locking device, the locking device including a foot coupled to the washer, a cap seated against the flange, and a link coupling the foot to the cap through the biasing element such that the biasing element is held between the washer and the flange.

10. A method in accordance with claim 7, wherein coupling a spacer to the base of the bracket comprises inserting a rivet through the spacer and the base.

\* \* \* \* \*